US009010742B2

(12) United States Patent
Koczera (10) Patent No.: US 9,010,742 B2
(45) Date of Patent: Apr. 21, 2015

(54) PART FIXTURING SYSTEMS HAVING EXPANDING CLAMPING DEVICES (76) Inventor: Richard Koczera, Eaton, OH (US)

(*) Notice: Subject to any disclaimer, the term of this patent is extended or adjusted under 35 U.S.C. 154(b) by 895 days.

(21) Appl. No.: 13/224,815

(22) Filed: Sep. 2, 2011

(65) Prior Publication Data
US 2012/0061896 A1 Mar. 15, 2012

Related U.S. Application Data (60) Provisional application No. 61/379,754, filed on Sep. 3, 2010.

(51) Int. Cl.
B25B 1/20 (2006.01)
B25B 1/22 (2006.01)
B25B 1/24 (2006.01)
B25B 5/16 (2006.01)
B23Q 3/06 (2006.01)
B25B 5/00 (2006.01)
B25B 5/10 (2006.01)
B25B 5/14 (2006.01)

(52) U.S. Cl.
CPC . *B23Q 3/06* (2013.01); *B25B 5/003* (2013.01); *B25B 5/10* (2013.01); *B25B 5/147* (2013.01)

(58) Field of Classification Search
CPC .......... B23Q 3/06; B25B 5/147; B25B 5/10; B25B 5/003; B25B 1/103; B25B 1/2405; B25B 1/2478; B25B 1/24
USPC ........ 269/43, 229, 231, 236, 282, 86; 24/525, 24/522
See application file for complete search history.

(56) References Cited

U.S. PATENT DOCUMENTS

| 2,542,674 | A |   | 2/1951  | Hill |
|-----------|---|---|---------|------|
| 2,564,138 | A | * | 8/1951  | Walker ........................ 269/138 |
| 2,671,366 | A |   | 3/1954  | Beusch |
| 2,991,669 | A | * | 7/1961  | Stock ........................... 269/154 |
| 3,014,717 | A |   | 12/1961 | Borodin et al. |
| 3,236,516 | A |   | 2/1966  | Young |
| 4,341,375 | A |   | 7/1982  | Romanin |
| 4,736,934 | A |   | 4/1988  | Grech |
| 6,322,061 | B1 | * | 11/2001 | Maser et al. .................. 269/17 |
| 2009/0283951 | A1 |   | 11/2009 | Rowley |

* cited by examiner

Primary Examiner — Lee D Wilson
Assistant Examiner — Seahee Yoon
(74) Attorney, Agent, or Firm — Dinsmore & Shohl LLP (57) ABSTRACT A part fixturing system for securing a workpiece includes an expanding clamping device and a work holding device. The expanding clamping device includes a clamp base portion, first and second traversing wedge blocks, an actuation screw, and a clamp plate portion. The clamp base portion comprises a longitudinal recess, and the traversing wedge blocks are located inside the longitudinal recess, each block including an inclined contact surface and a threaded aperture. The actuation screw passes through the longitudinal recess of the clamp base portion and the threaded apertures of the traversing wedge blocks. The clamp plate portion comprises first and second declined contact surfaces. The work holding device comprises first and second support columns that define a longitudinal loading envelope. The expanding clamping device is positioned inside the longitudinal loading envelope of the work holding device and couples the workpiece to the first and second support columns.

13 Claims, 7 Drawing Sheets

PART FIXTURING SYSTEMS HAVING EXPANDING CLAMPING DEVICES

CROSS-REFERENCE TO RELATED APPLICATIONS

This application claims priority to U.S. Provisional Application Ser. No. 61/379,754 filed Sep. 3, 2010, titled "Work Holding Device and Method." This application is related to co-pending application U.S. Ser. No. 13/224,827, filed Sep. 2, 2011, titled "Work Holding Devices."

BACKGROUND

The present disclosure is generally directed to part fixturing systems and, more specifically, part fixturing systems used to hold workpieces using expanding clamping devices.

SUMMARY

Part fixturing systems allow workpieces to be held for a machining operation. A part fixturing system is secured to a pallet of a machining center. In general, when a workpiece is inserted into the part fixturing system, the location of the workpiece within the machining center is programmed into the controller of the machining center, or the operation is "setup." Subsequent operations require an operator of the machining center to re-fixture the workpiece in the machining center and/or program the location of the workpiece in the machining center.

The inventor has identified that for certain machined parts, decreasing the number of operations performed on a single workpiece increases part throughput. Further, as the number of operations decreases, the corresponding number of setups required to machine the part decrease, further increasing throughput and decreasing the likelihood of misalignment due to machining inaccuracies including, but not limited to, tool wear, machine backlash, fixturing inaccuracies, and/or measuring inaccuracies. Embodiments of the present disclosure provide clamping devices for securing workpieces in work holding devices, thereby forming part fixturing systems that accommodate machining on multiple surfaces of a workpiece without breaking workpiece setup.

In one embodiment, a part fixturing system for securing a workpiece includes an expanding clamping device and a work holding device. The expanding clamping device includes a clamp base portion, a first and a second traversing wedge blocks, an actuation screw, and a clamp plate portion. The clamp base portion comprises a longitudinal recess, and the first and the second traversing wedge blocks are located inside the longitudinal recess, each traversing wedge block including an inclined contact surface and a threaded aperture. The actuation screw passes through the longitudinal recess of the clamp base portion and the threaded apertures of the traversing wedge blocks. The clamp plate portion comprises a first declined contact surface and a second declined contact surface. The work holding device comprises a first support column and a second support column that define a longitudinal loading envelope, and the expanding clamping device is positioned inside the longitudinal loading envelope of the work holding device. The expanding clamping device couples the workpiece to the first support column and the second support column.

In another embodiment, a expanding clamping device includes a clamp base portion having a longitudinal recess and a first and a second traversing wedge block located inside the longitudinal recess, each traversing wedge block comprising an inclined contact surface and a threaded aperture. An actuation screw passes through the longitudinal recess of the clamp base portion and the threaded apertures of the traversing wedge blocks. A clamp plate portion includes a first and a second declined contact surface, where the inclined contact surfaces of the traversing wedge blocks contact the declined contact surfaces of the clamp plate portion.

In yet another embodiment, a part fixturing system for securing a workpiece includes a work holding device and an expanding clamping device. The work holding device includes a first support column and a second support column that define a longitudinal loading envelope. The expanding clamping device includes a clamp base portion and a clamp plate portion that translates away from the clamp base portion. The expanding clamping device is positioned inside the longitudinal loading envelope of the work holding device, and the expanding clamping device couples the workpiece to the first support column and the second support column.

In yet another embodiment, an expanding clamping device includes a clamp base portion, an opening mechanism, and a clamp plate portion. The clamp base portion includes a first and a second longitudinal key portion extending opposite one another. The clamp base portion further includes a machining datum surface located opposite the clamp plate portion. The clamp plate portion translates a clamp expansion dimension as the expanding clamping device expands between a collapsed position and a deployed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to part fixturing systems that secure a workpiece for machining operations. The part fixturing system includes an expanding clamping device and a work holding device. The expanding clamping device is inserted into a longitudinal loading envelope of the work holding device formed by a first support column and a second support column. An operator actuates the expanding clamping device to move from a collapsed position towards a deployed position. As the expanding clamping device contacts the workpiece, the expanding clamping device couples the workpiece to the first and second support columns.

Figure 1:
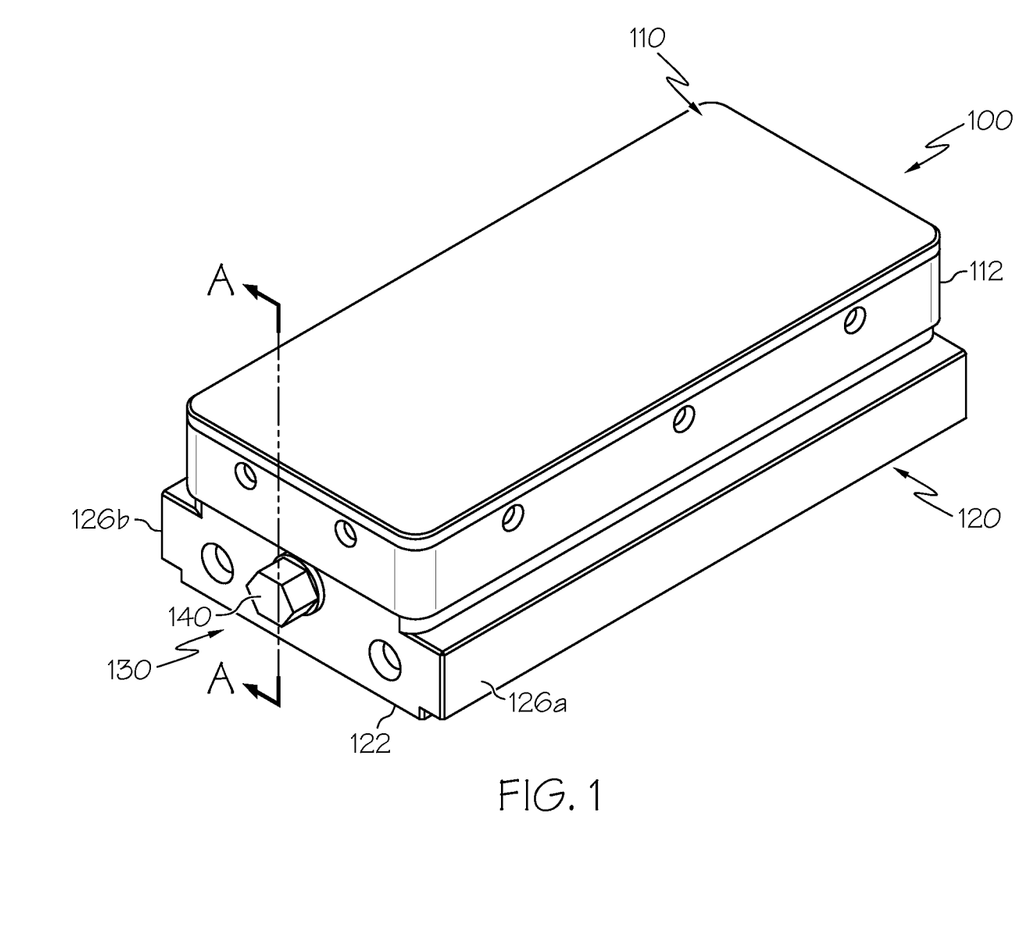
FIG. 1 depicts a front perspective view of an expanding clamping device according to one or more embodiments shown and described herein.

One embodiment of the expanding clamping device 100 is depicted in FIG. 1. The expanding clamping device 100 includes a clamp base portion 120 and a clamp plate portion 110. The clamp base portion 120 and the clamp plate portion 110 are connected to one another through an opening mechanism 130. The opening mechanism 130 allows an operator to actuate the expanding clamping device 100 such that the clamp plate portion 110 translates away from the clamp base portion 120. The clamp base portion 120 includes a first longitudinal key portion 126a and a second longitudinal key portion 126b that extend from opposite sides of the clamp base portion 120. The clamp base portion 120 also includes a machining datum surface 122 located on a side opposite the clamp plate portion 110. The first and second longitudinal key portions 126a, 126b are inserted into corresponding longitudinal channels that extend in the work holding device, as will be described in greater detail below. The clamp plate portion 110 includes a skirt 112 that extends towards the clamp base portion 120. The skirt 112 overlaps a portion of the clamp base portion 120, preventing ingestion of foreign objects between the clamp plate portion 110 and the clamp base portion 120.

Figure 2:
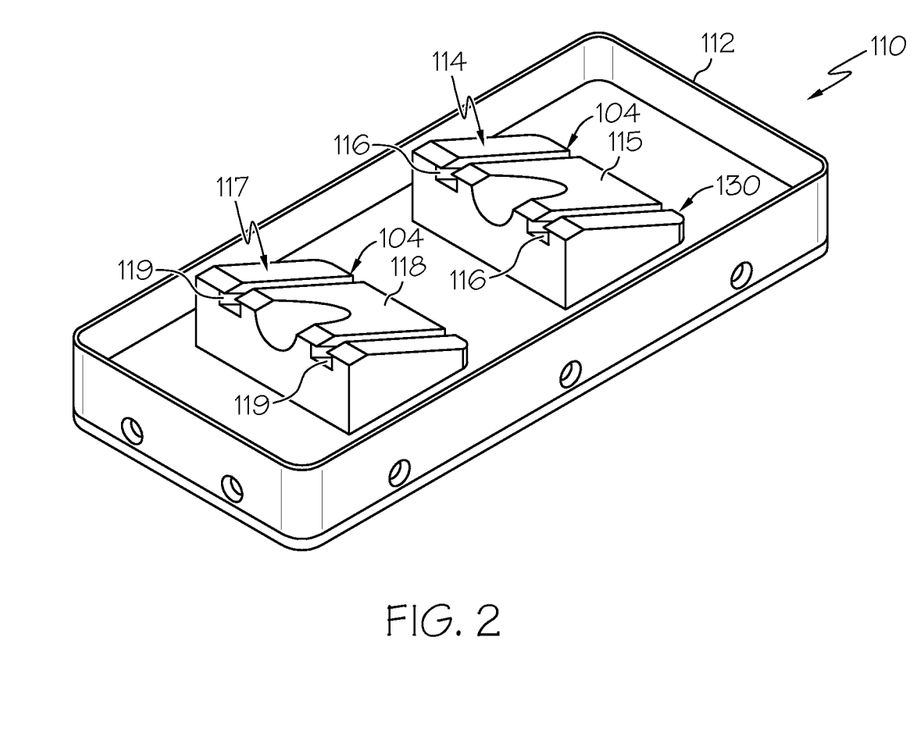
FIG. 2 depicts a rear perspective view of a portion of an expanding clamping device according to one or more embodiments shown and described herein.
Figure 3:
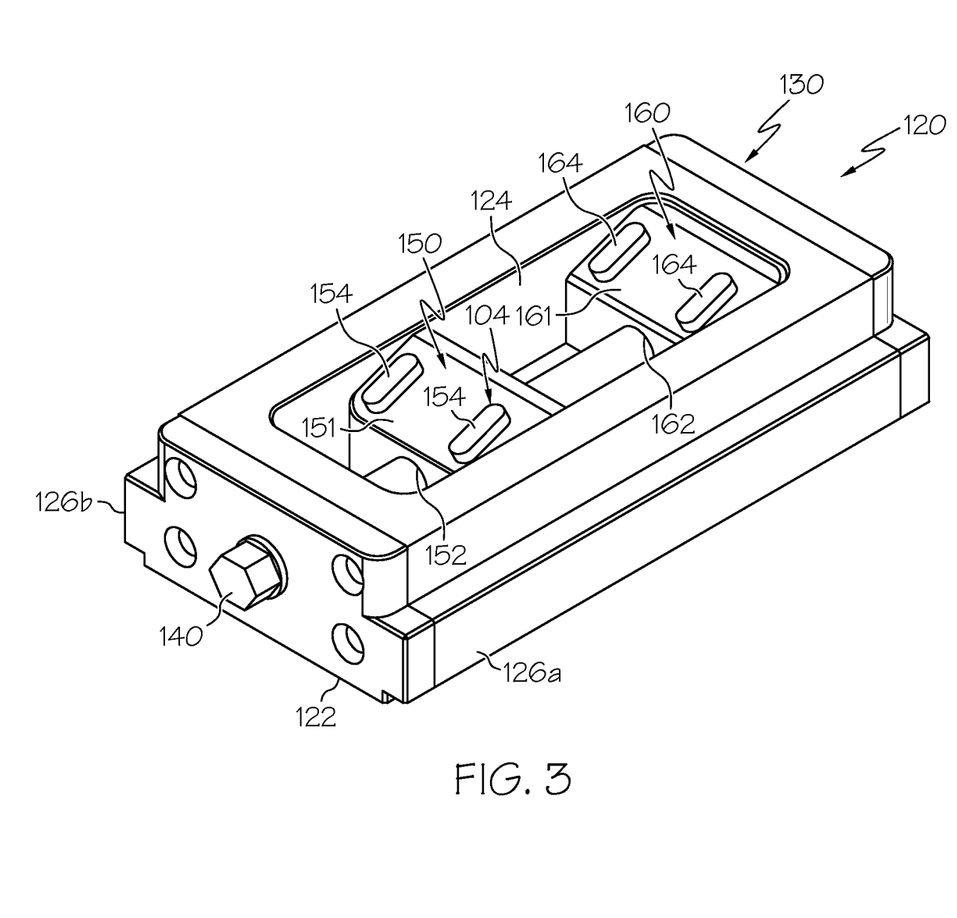
FIG. 3 depicts a front perspective view of a portion of an expanding clamping device according to one or more embodiments shown and described herein.
Figure 4:
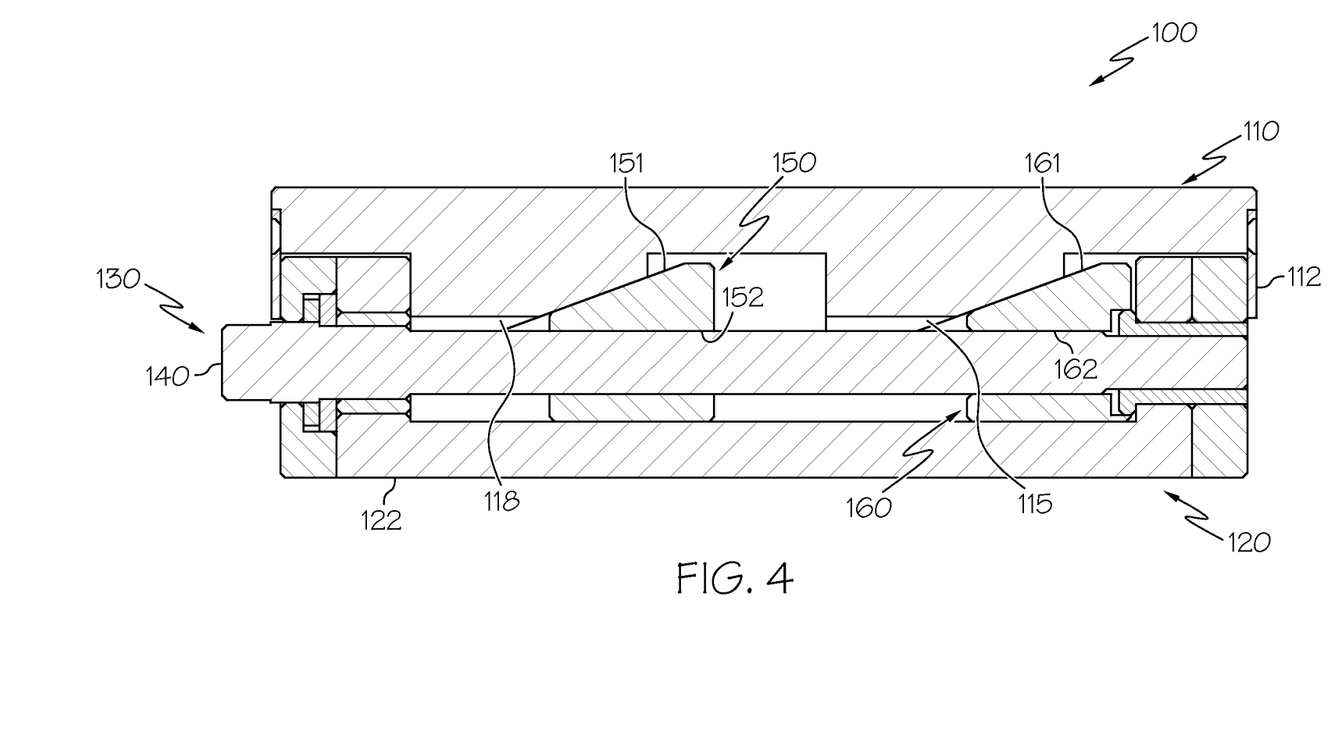
FIG. 4 depicts a sectional side view of the expanding clamping device of FIG. 1 shown along line A-A.

A variety of opening mechanisms 130 are contemplated for use with the expanding clamping device 100, including a scissor-type or a hydraulically-actuated jacking mechanism. The opening mechanism 130 illustrated in FIGS. 2 and 3 is a mechanical jacking mechanism that includes a first traversing wedge block 150 and a second traversing wedge block 160 that are located inside a longitudinal recess 124 of the clamp base portion 120. The first and second traversing wedge blocks 150, 160 each include an inclined contact surface 151, 161 and a threaded aperture 152, 162. The opening mechanism 130 further includes an actuation screw 140 that passes through the longitudinal recess 124 of the clamp base portion 120 and the threaded apertures 152, 162 of the first and second traversing wedge blocks 150, 160. The opening mechanism 130 also includes a first static wedge block 114 having a first declined contact surface 115 and a second static wedge block 117 having a second declined contact surface 118, where both the first and the second declined contact surfaces 115, 118 are incorporated into the clamp plate portion 110. When the clamp plate portion 110 is assembled with the clamp base portion 120, the first inclined contact surface 151 is placed into contact with the first declined contact surface 115 and the second inclined contact surface 161 is placed into contact with the second declined contact surface 118, as illustrated in FIG. 4.

As an operator rotates the actuation screw 140, the first and second traversing wedge blocks 150, 160 will translate along the longitudinal recess 124. The distance traveled by the first and second traversing wedge blocks 150, 160 corresponds to the thread pitch of the actuation screw 140. As the first and second traversing wedge blocks 150, 160 translate towards the first and second static wedge blocks 114, 117, the adjacent inclined contact surfaces 151, 161 and declined contact surfaces 115, 118 slide relative to one another, such that the first and second traversing wedge blocks 150, 160 force the clamp plate portion 110 away from the clamp base portion 120.

When the actuation screw 140 is rotated the opposite direction, the first and second traversing wedge blocks 150, 160 translate away from the first and second static wedge blocks 114, 117, which allows the clamp plate portion 110 to retract towards the clamp base portion 120.

Figure 5:
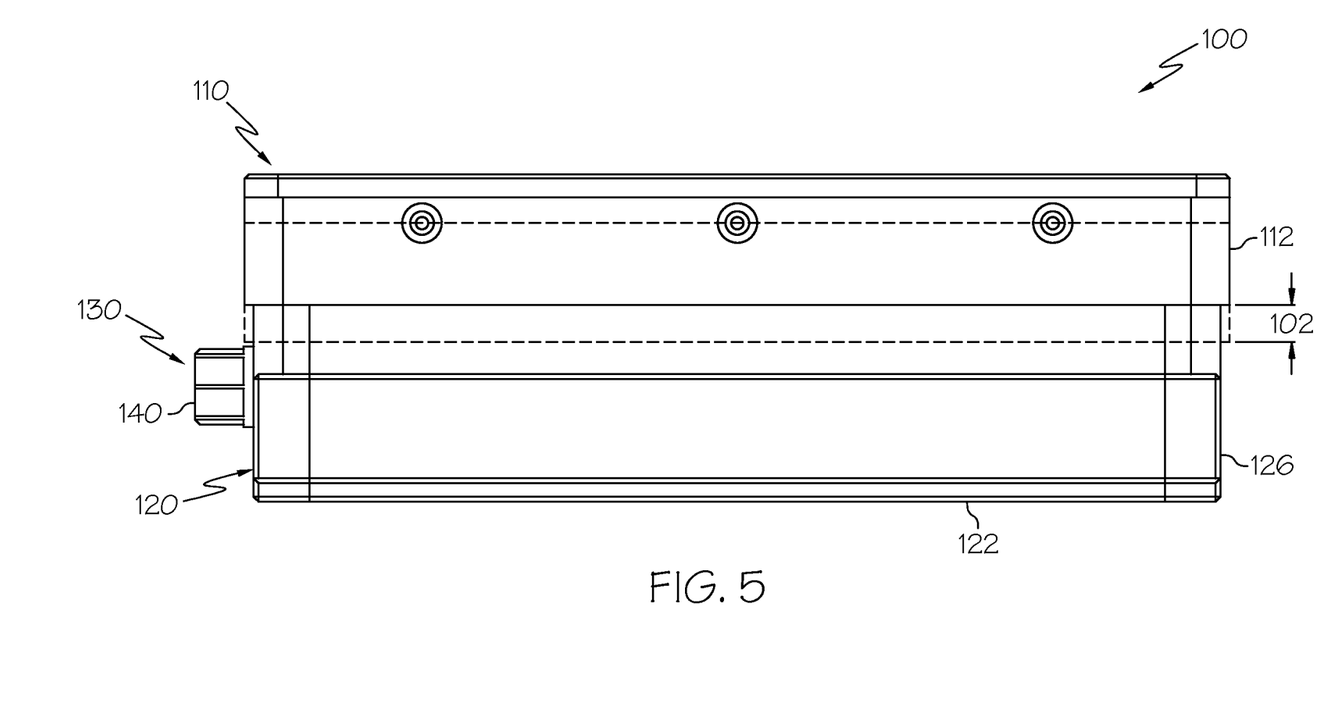
FIG. 5 depicts a side view of a potion of an expanding clamping device according to one or more embodiments shown and described herein.

The expanding clamping device 100 can be actuated by an operator to position the clamp plate portion 110 between a deployed position, as illustrated by the solid lines in FIG. 5, and a collapsed position, as illustrated by the dashed lines in FIG. 5. The clamp expansion dimension 102 represents the distance the clamp plate portion 110 can be adjusted away from the clamp base portion 120. As is further illustrated, the skirt 112 that extends from the clamp plate portion 110 overlaps a portion of the clamp base portion 120 when the expanding clamping device 100 is in both the collapsed position and the deployed position.

Figure 6:
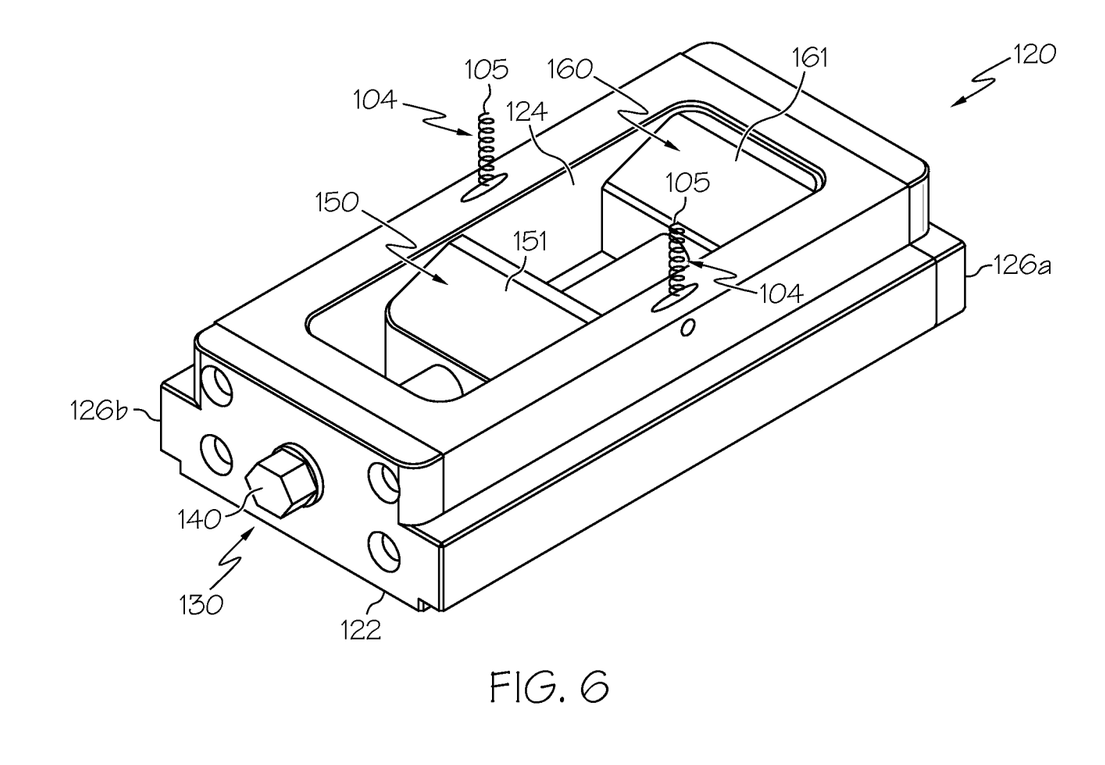
FIG. 6 depicts a front perspective view of an expanding clamping device according to one or more embodiments shown and described herein.

The expanding clamping device 100 also includes a retention mechanism 104 that is adapted to limit a separation distance between the clamp base portion 120 and the clamp plate portion 110. The retention mechanism 104 allows the expanding clamping device 100 to be used while inverted, such that the clamp plate portion 110 is located below the clamp base portion 120. One embodiment of the retention mechanism 104 is depicted in FIGS. 2 and 3 and includes an interlocking interface that is created when first retention keys 154 and second retention keys 164 are inserted into first retention keyways 116 and second retention keyways 119. The interlocking interface created by the retention keys 154, 164 and retention keyways 116, 119 allow the first and second traversing wedge blocks 150, 160 to position the expanding clamping device 100 in the collapsed or deployed positions while maintaining secured contact between the clamp plate portion 110 and the clamp base portion 120. Another embodiment of the retention mechanism 104 is illustrated in FIG. 6. In this embodiment, the retention mechanism 104 includes a tension spring 105 that is coupled both to the clamp base portion 120 and the clamp plate portion 110 (not shown). The tension spring 105 provides a biasing force that limits the separation distance of the clamp plate portion 110 and the clamp base portion 120.

Figure 7:
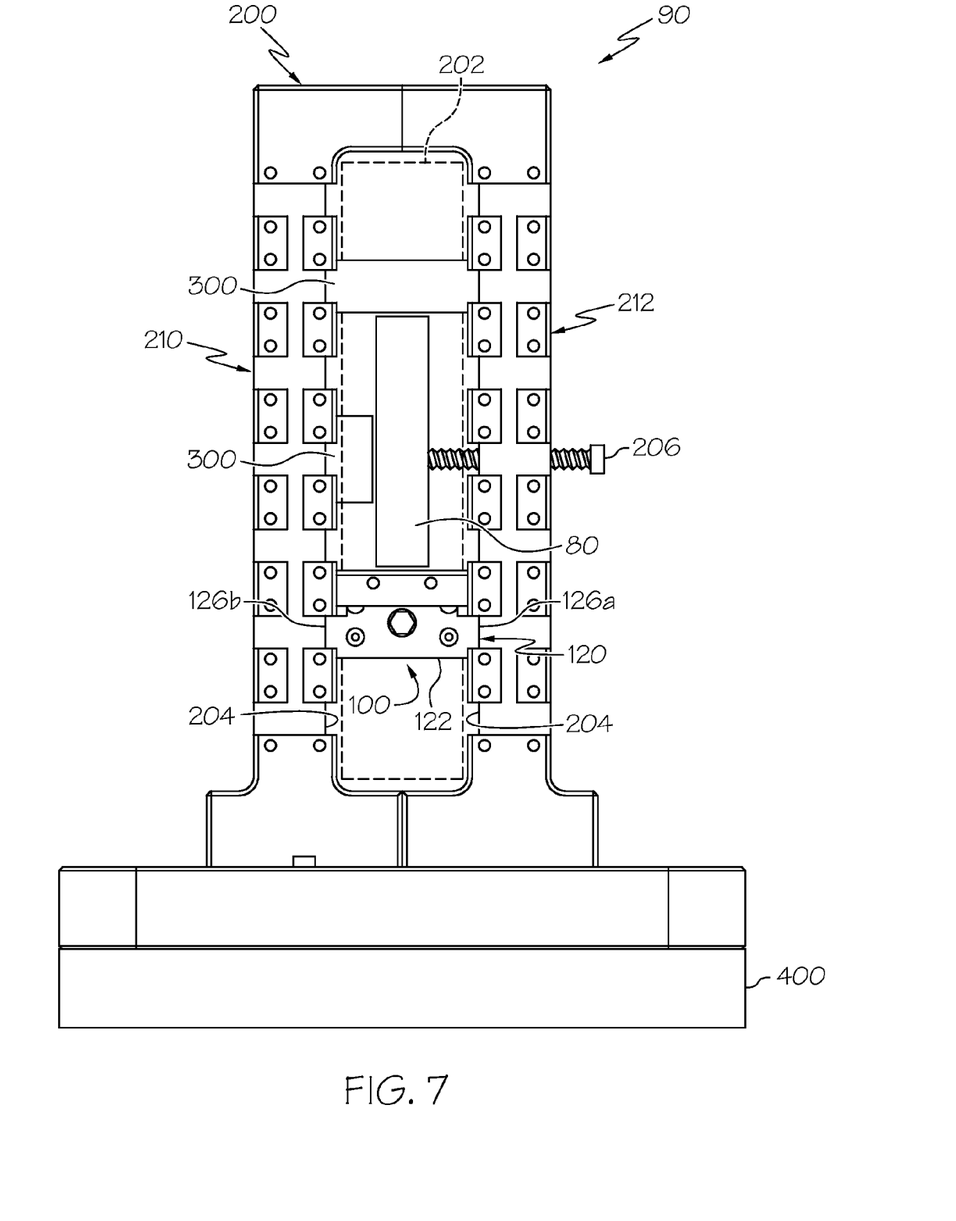
FIG. 7 depicts a front view of a part fixturing system including an expanding clamping device and a work holding device according to one or more embodiments shown and described herein.

The expanding clamping device 100 is used in conjunction with a work holding device 200 in the part fixturing system 90, as depicted in FIG. 7. The work holding device 200 includes a first support column 210 and a second support column 212 that form a longitudinal loading envelope 202 inside of the first and second support columns 210, 212. Each of the first and second support columns 210, 212 include a plurality of longitudinal channels 204 that extend along the length of the longitudinal loading envelope 202. The expanding clamping device 100 may be inserted into the longitudinal loading envelope 202 by sliding the first and second longitudinal key portions 126a, 126b into corresponding longitudinal channels 204 in the first and second support columns 210, 212. Part support brackets 300 having keys may be inserted into the longitudinal channels 204 at locations along the longitudinal loading envelope 202 that are appropriate for the size of the workpiece 80.

With the part support brackets 300 and the expanding clamping device 100 positioned within the longitudinal loading envelope 202, the workpiece 80 can be inserted into the longitudinal loading envelope 202. An operator can actuate the expanding clamping device 100 such that the clamp plate portion 110 applies a retention force to the workpiece 80 and couple the workpiece 80 to the first support column 210 and the second support column 212. In addition, one or more part fixturing anchors 206 may extend into the longitudinal loading envelope 202 and apply a retention force to the workpiece 80.

As illustrated in FIG. 7, the expanding clamping device 100 is located in an "upright" orientation, with the clamp plate portion 110 positioned above the clamp base portion 120. As discussed above, the expanding clamping device 100 can be inverted, such that the expanding clamping device 100 extends downwards towards the workpiece 80. In addition, the machining datum surface 122 of the clamp base portion 120 is located opposite the clamp plate portion 110. An additional workpiece (not shown) may be inserted into the longitudinal loading envelope 202 such that the additional workpiece contacts the machining datum surface 122. The additional workpiece may then be secured against the machining datum surface 122, coupling the workpiece to the first support column 210 and the second support column 212. In this configuration, multiple workpieces can be secured within the longitudinal loading envelope 202.

Part fixturing systems 90 including expanding clamping devices 100 and work holding devices 200 according to the present disclosure may be made from a variety of materials including, but not limited to, metals or polymers. Appropriate metals may include aluminum or alloys thereof, steel alloys, or cast iron. In one embodiment, the clamp base portion 120 and the clamp plate portion 110 of the expanding clamping device 100 and the first and second support columns 210, 212 may be made from a 6000-series aluminum alloy, while the actuation screw 140 is made from hardened steel. Appropriate polymers may include epoxy, nylon, polycarbonate, which may be reinforced with an appropriate reinforcements, which may include include glass or carbon. In one embodiment, the clamp base portion 120 and the clamp plate portion 110 of the expanding clamping device 100 and the first and second support columns 210, 212 may be made a reinforce polymer composite that includes epoxy that is reinforced with chopped carbon fibers. The density of the chopped carbon fibers and the epoxy may be varied depending on the strength requirements of the expanding clamping device 100 and the work holding device 200. In yet another embodiment, the clamp base portion 120 and the clamp plate portion 110 of the expanding clamping device 100 and the first and second support columns 210, 212 may be made from a reinforced polymer composite that includes nanoparticulates, for example carbon nanotubes, in a polymer matrix. The expanding clamping device 100 and the work holding device 200 may be surface treated to prevent corrosion and/or increase durability of external surfaces.

It should now be understood that part fixturing systems according to the present disclosure include expanding clamping devices and work holding devices. An expanding clamping device is inserted into a longitudinal loading envelope of a work holding device. An operator actuates an opening mechanism that moves the expanding clamping device towards a deployed position. As the expanding clamping device contacts a workpiece, the expanding clamping device applies a retention force to the workpiece that couples the workpiece to the work holding device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A part fixturing system for securing a workpiece, the part fixturing system comprising an expanding clamping device and a work holding device, wherein:
    the expanding clamping device comprises a clamp base portion, a first and a second traversing wedge blocks, an actuation screw, and a clamp plate portion;
    the clamp base portion comprises a longitudinal recess;
    the first and the second traversing wedge blocks are located inside the longitudinal recess, each comprising an inclined contact surface and a threaded aperture;
    the actuation screw passes through the longitudinal recess of the clamp base portion and the threaded apertures of the traversing wedge blocks;
    the clamp plate portion comprises a first declined contact surface and a second declined contact surface;
    the work holding device comprises a first support column and a second support column that define a longitudinal loading envelope;
    the expanding clamping device is positioned inside the longitudinal loading envelope of the work holding device; and
    the expanding clamping device couples the workpiece to the first support column and the second support column.

2. The part fixturing system of claim 1, wherein the clamp plate portion travels a clamp expansion dimension as the expanding clamping device expands between a collapsed position and a deployed position.

3. The part fixturing system of claim 2, wherein the clamp plate portion further comprises a skirt extending towards the clamp base portion.

4. The part fixturing system of claim 3, wherein the skirt overlaps the clamp base portion when the expanding clamping device is in the deployed position.

5. The part fixturing system of claim 1, wherein the expanding clamping device further comprises a retention mechanism adapted to limit a separation distance between the clamp base portion and the clamp plate portion.

6. The part fixturing system of claim 5, wherein the retention mechanism comprises a tension spring.

7. The part fixturing system of claim 5, wherein the retention mechanism comprises an interlocking interface between the inclined contact surfaces and the declined contact surfaces.

8. The part fixturing system of claim 1, wherein the clamp base portion further comprises a first and a second longitudinal key portion extending from opposite sides of the clamp base portion.

9. The part fixturing system of claim 1, wherein the clamp base portion further comprises a machining datum surface located on a side opposite the clamp plate portion.

10. A part fixturing system for securing a workpiece, the part fixturing system comprising a work holding device and an expanding clamping device, wherein:
    the work holding device comprises a first support column and a second support column that define a longitudinal loading envelope;

the expanding clamping device comprises a clamp base portion and a clamp plate portion that travels away from the clamp base portion;

the expanding clamping device further comprises an opening mechanism adapted to control a separation distance between the clamp base portion and the clamp plate portion;

the opening mechanism comprises a first and a second traversing wedge block, each comprising an inclined contact surface and a threaded aperture, an actuation screw secured to the clamp base portion and passing through the threaded apertures of the traversing wedge blocks, and first and second declined contact surfaces coupled to the clamp plate portion;

the expanding clamping device is positioned inside the longitudinal loading envelope of the work holding device; and the expanding clamping device couples the workpiece to the first support column and the second support column.

11. The part fixturing system of claim 10, wherein:

the work holding device further comprises a plurality of longitudinal channels extending along inside faces of the first and the second support columns; and the expanding clamping device further comprises a first and a second longitudinal key portions extending from the clamp base portion; and the first and the second longitudinal key portions are located within the longitudinal channels.

12. The part fixturing system of claim 11, wherein the clamp base portion further comprises a machining datum surface located opposite the clamp plate portion.

13. The part fixturing system of claim 10, wherein the expanding clamping device further comprises a retention mechanism adapted to limit a separation distance between the clamp base portion and the clamp plate portion.

* * * * *